(12) United States Patent
Liu

(10) Patent No.: US 11,382,069 B2
(45) Date of Patent: Jul. 5, 2022

(54) METHOD FOR INDICATING RELATIVE POSITION INFORMATION OF CORESET OF RMSI, METHOD FOR OBTAINING CORESET OF RMSI, AND UE

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 29 days.

(21) Appl. No.: 16/862,544

(22) Filed: Apr. 29, 2020

(65) Prior Publication Data

US 2020/0260412 A1 Aug. 13, 2020

Related U.S. Application Data

(63) Continuation of application No. PCT/CN2017/110927, filed on Nov. 14, 2017.

(51) Int. Cl.
| | | |
|---|---|---|
| *H04W 72/00* | (2009.01) | |
| *H04W 56/00* | (2009.01) | |
| *H04W 72/04* | (2009.01) | |
| *H04W 48/16* | (2009.01) | |

(52) U.S. Cl.
CPC ......... *H04W 72/005* (2013.01); *H04W 48/16* (2013.01); *H04W 56/001* (2013.01); *H04W 72/0453* (2013.01); *H04W 72/0493* (2013.01)

(58) Field of Classification Search
None
See application file for complete search history.

(56) References Cited

U.S. PATENT DOCUMENTS

| | | | |
|---|---|---|---|
| 10,728,916 | B2 * | 7/2020 | Ly ...................... H04W 56/001 |
| 2010/0124919 | A1 | 5/2010 | Ko |
| 2013/0275400 | A1 | 10/2013 | Rus |
| 2015/0103715 | A1 | 4/2015 | Chen et al. |
| 2015/0103777 | A1 | 4/2015 | Chen et al. |

(Continued)

FOREIGN PATENT DOCUMENTS

| | | |
|---|---|---|
| CN | 101300802 A | 11/2008 |
| CN | 101395830 A | 3/2009 |

(Continued)

OTHER PUBLICATIONS

3GPP TSG-RAN WG1 NR AH#3 R1-1716524, Nagoya, Japan, Sep. 18-21, 2017, Agenda item: 6.1.2.1; Source: Nokia, Nokia Shanghai Bell; Title: Remaining details on NR-PBCH.

(Continued)

*Primary Examiner* — Saba Tsegaye
(74) *Attorney, Agent, or Firm* — Syncoda LLC; Feng Ma

(57) ABSTRACT

A method for indicating relative position information of a common control resource set (CORESET) of remaining minimum system information (RMSI) includes: determining indication information included in a physical broadcast channel (PBCH) of a synchronization signal block (SSB), the indication information including first indication information indicating a relative position between a CORESET of RMSI corresponding to the SSB and the SSB; and sending the SSB including the indication information and the CORESET of the RMSI to user equipment (UE).

18 Claims, 15 Drawing Sheets

Indication information is added into a PBCH of an SSB, the indication information includes first indication information, and the first indication information is configured to indicate that a CORESET of RMSI corresponding to the SSB and the SSB are time division multiplexed or frequency division multiplexed — S101

The SSB icluding the indication information and the CORESET of the RMSI are sent to UE in a beam scanning manner — S102

(56) References Cited

U.S. PATENT DOCUMENTS

| | | | |
|---|---|---|---|
| 2015/0201249 A1 | 7/2015 | Ryu et al. | |
| 2017/0339683 A1 | 11/2017 | Chen et al. | |
| 2018/0049203 A1 | 2/2018 | Xue et al. | |
| 2018/0098361 A1 | 4/2018 | Ji et al. | |
| 2019/0053293 A1 | 2/2019 | Akoum et al. | |
| 2019/0089474 A1 | 3/2019 | Ly et al. | |
| 2019/0123992 A1 | 4/2019 | Ly et al. | |
| 2019/0159264 A1 | 5/2019 | Zhang | |
| 2020/0045672 A1 | 2/2020 | Yang | |
| 2020/0059911 A1 | 2/2020 | Tang et al. | |
| 2020/0162217 A1* | 5/2020 | Liu | H04W 56/0045 |
| 2020/0178253 A1 | 6/2020 | Gao et al. | |
| 2020/0220691 A1 | 7/2020 | Gao et al. | |
| 2020/0228275 A1* | 7/2020 | Li | H04L 5/0094 |
| 2020/0296656 A1* | 9/2020 | Amuru | H04W 48/12 |
| 2020/0314776 A1 | 10/2020 | Harada et al. | |
| 2020/0344097 A1 | 10/2020 | Si et al. | |

FOREIGN PATENT DOCUMENTS

| | | |
|---|---|---|
| CN | 101453243 A | 6/2009 |
| CN | 102007808 A | 4/2011 |
| CN | 101578902 B | 6/2012 |
| CN | 103931254 A | 7/2014 |
| CN | 105612801 A | 5/2016 |
| CN | 106851840 A | 6/2017 |
| CN | 107278383 A | 10/2017 |
| EP | 2787671 A1 | 10/2014 |
| EP | 3694283 A1 | 8/2020 |
| RU | 2428815 C2 | 9/2011 |
| RU | 2602808 C1 | 11/2016 |
| WO | 2014162568 A1 | 10/2014 |
| WO | 2017052458 A1 | 3/2017 |

OTHER PUBLICATIONS

3GPP TSG RAN WG1 Meeting 90bis R1-1718181, Prague, CZ, Oct. 9-13, 2017, Source: NTT Docomo, Inc.; Title: Discussion on remaining details on RMSI delivery.
3GPP TSG RAN WG1 Meeting NR#3 R1-1715378, Nagoya, Japan, Sep. 18-21, 2017, Source: ZTE, Sanechips; Title: Remaining details of RMSI.
Supplementary European Search Report in European Application No. 17932074.2, dated May 3, 2021.
First Office Action of Japanese Application No. 2020-543663, dated Jun. 15, 2021.
Qualcomm Incorporated. Remaining System Information Delivery Consideration. 3GPP TSG RAN WG1 Meeting 90bis, R1-1718528. Oct. 13, 2017 (Oct. 13, 2017), sections 2.1, 2.2 and 3.
Catt. Offline Summary for AI 7 .1. 2.2 Remaining Details on Remaining Minimum System Information. 3GPP TSG RAN WG1 Meeting 90bis, R1-1718772. Oct. 13, 2017 (Oct. 13, 2017), sections 2.2 and 2.6.2.
LG Electronics. Discussion on Search Space Design. 3GPPTSG RAN WG1 Meeting 90bis, R1-1717952. Oct. 13, 2017 (Oct. 13, 2017), entire document.
Intel Corporation. "Details on NR PBCH design", 3GPP TSG RAN WG1 Meeting RAN1#89, R1-1707339, May 19, 2017 (May 19, 2017), p. 1-4.
3GPP TR 38.811V0.1.0 (Jun. 2017), Technical Specification Group Radio Access Network Study on New Radio (NR) to support Non Terrestrial Networks (Release 15).
International Search Report in the international application No. PCT/CN2017/110927, dated Aug. 7, 2018.
English translation of the Written Opinion of the International Search Authority in the international application No. PCT/CN2017/110927, dated Aug. 7, 2018.
First Office Action of the Chinese application No. 201780001912.2, dated Mar. 13, 2019.
First Office Action of Russian Application No. 2020118936, dated Sep. 30, 2020.
Notice of Allowance of Russian Application No. 2020118936, dated Dec. 3, 2020.
Huawei ct al. NR-PBCH Contents and Payload Size. 3GPP TSG RAN WG1 Meeting #90, R1-1712143. Aug. 25, 2017 (Aug. 25, 2017), p. 4, line 1 to p. 5, line 10.
Nokia et al. Remaining Details on NR-PBCH. 3GPP TSG-RAN WG1 Meeting 90bis R1-1718612. Oct. 13, 2017 (Oct. 13, 2017), entire document.
Vivo. Remaining Aspects on NR-PBCH Contents and Payload. 3GPP TSG RAN WG1 NR Ad-Hoc#3. R1-1715607. Sep. 21, 2017 (Sep. 21, 2017), entire document.
NTT Docomo ct al. Draft LS on NR Initial Access and Mobility. 3GPP TSG RAN WG Meeting #90 R1-1715259. Aug. 25, 2017 (Aug. 25, 2017), entire document.
Written Opinion of the International Search Authority in the international application No. PCT/CN2017/111084, dated Aug. 3, 2018.
International Search Report in the international application No. PCT/CN2017/111084, dated Aug. 3, 2018.
Catt, "Offline summary for AI 7.1.2.2 Remaining details on Remaining Minimum System Information", 3GPP TSG RAN WG1 Meeting 90bis R1-1719145, Prague, CZ, Oct. 9-13, 2017.
Catt, "Remaining details on RMSI", 3GPP TSG RAN WG1 Meeting 90bis R1-1717799, Prague, CZ, Oct. 9-13, 2017.
First Office Action of the Chinese application No. 201780001841.6, dated Apr. 14, 2021.
MCC Support: "Final Report of 3GPP TSG RAN WG1 #AH_NR3 V1.0.0", 3GPP Draft; Final Minutes Report RAN1 #AH NR3 V100, 3rd Generation Partnership Project (3GPP), Mobile Competence Centre; 650, Route Des Lucioles; F-06921 Sophia-Antipolis Cedex; France vol. RAN WG1, No. Prague, Czech Rep; Oct. 9, 2017-Oct. 13, 2017, XP051354030, the whole document.
MCC Support: "Final Report of 3GPP TSG RAN WG1 #AH_NR2 V1.0.0", 3GPP Draft; Final Minutes Report RAN1 #AH NR2 V100, 3rd Generation Partnership Project (3GPP), Mobile Competence Centre; 650, Route Des Lucioles; F-06921 Sophia-Antipolis Cedex; France vol. RAN WG1, No. Prague, Czech Rep; Aug. 21, 2017-2017082520, XP051328123, the whole document.
NTT Docomo et al: "Discussion on remaining details on NR-PBCH and PBCH-DMRS", 3GPP Draft: R1-1718180 Remaining Details on NR-PBCH Final, 3rd Generation Partnership Project (3GPP), Mobile Competence Centre: 650, Route Deslucioles: F-06921 Sophia-Anti Polis Cedex France vol. RAN WG1, No. Prague, CZ; Oct. 9, 2017-Oct. 13, 2017, XP051352888, the whole document.
Qualcomm Incorporated: "Remaining details on NR-PBCH", 3GPP Draft; R1-1716379 Remaining Details on NR-PBCH, 3rd Generation Partnership Project (3GPP), Mobile Competence Centre: 650, Route Des Lucioles; F-06921Sophia-Antipolis Cedex France vol. RAN WG1, No. Nagoya, Japan; Sep. 18, 2017-Sep. 21, 2017, XP051329968, the whole document.
Supplementary European Search Report in the European application No. 17932403.3, dated Jun. 21, 2021.
First Office Action of the U.S. Appl. No. 16/762,657, dated Sep. 28, 2021.
International Search Report in the international application No. PCT/CN2017/111284, dated Aug. 13, 2018.
Written Opinion of the International Search Authority in the international application No. PCT/CN2017/111284, dated Aug. 13, 2018.
Vivo. "Remaining Aspects on NR-PBCH Contents and Payload" 3GPP TSG RAN WG1 Meeting #90bis R1-1717460,Oct. 13, 2017 (Oct. 13, 2017), pp. 1-7.
NTT Docomo, Inc."Discussion on Remaining Details on NR-PBCH and PBCH-DMRS" 3GPP TSG RAN WG1 Meeting NR#3 R1-1716070, Sep. 21, 2017(Sep. 21, 2017), pp. 1-15.
First Office Action of the Chinese application No. 201780001948.0, dated Nov. 4, 2020.
First Office Action of the U.S. Appl. No. 16/872,340, dated Oct. 25, 2021.
Office Action of the Indian application No. 202047024595, dated Aug. 5, 2021.

(56) References Cited

OTHER PUBLICATIONS

Final Office Action of the U.S. Appl. No. 16/762,657, dated Mar. 8, 2022.

* cited by examiner

METHOD FOR INDICATING RELATIVE POSITION INFORMATION OF CORESET OF RMSI, METHOD FOR OBTAINING CORESET OF RMSI, AND UE

CROSS-REFERENCE TO RELATED APPLICATION

The present application is a continuation of International Application No. PCT/CN2017/110927 filed on Nov. 14, 2017, the disclosure of which is hereby incorporated by reference in its entirety.

BACKGROUND

In recent discussions of the $3^{rd}$-generation partnership project (3GPP), how to indicate a time-frequency position of a common CORESET of RMSI in a physical broadcast channel (PBCH) is an important topic. A length of only about 8 bits is reserved for indication information of a CORESET of RMSI in a present PBCH and one or two bits may be required to be reserved for future use, which makes a great challenge to indication of a frequency-domain position of the CORESET of the RMSI in a broadband system. At present, multiple synchronization signal blocks (SSBs) may correspond to a piece of RMSI, which further increases difficulties in indication of the frequency-domain position. Moreover, considering time-domain merging of PBCHs, it is required that PBCH contents of the SSBs corresponding to each beam are consistent, which further restricts the degree of freedom of frequency-domain indication of the CORESET of the RMSI and increases the difficulties in indication.

SUMMARY

The present disclosure generally relates to the technical field of communications, and more specifically to a method for indicating relative position information of a common control resource set (CORESET) of remaining minimum system information (RMSI), a method for obtaining a CORESET of RMSI, and user equipment (UE).

According to a first aspect of embodiments of the present disclosure, there is provided a method for indicating relative position information of a common control resource set (CORESET) of remaining minimum system information (RMSI), which is for applying to a base station and includes:

determining indication information included in a physical broadcast channel (PBCH) of a synchronization signal block (SSB), the indication information including first indication information and the first indication information being configured to indicate a relative position between a CORESET of RMSI corresponding to the SSB and the SSB; and sending the SSB including the indication information and the CORESET of the RMSI to user equipment (UE).

According to a second aspect of embodiments of the present disclosure, there is provided a method for obtaining a common control resource set (CORESET) of remaining minimum system information (RMSI), which is for applying to user equipment (UE) and includes:

receiving a synchronization signal block (SSB) including indication information from a base station, the indication information including first indication information and the first indication information being configured to indicate a relative position between a CORESET of RMSI corresponding to the SSB and the SSB; and obtaining the indication information from the SSB.

According to a third aspect of embodiments of the present disclosure, there is provided user equipment (UE), which includes: a processor; and a memory configured to store instructions executable for the processor; the processor is configured to perform the above method.

It is to be understood that the above general descriptions and detailed descriptions below are only exemplary and explanatory and not intended to limit the present disclosure.

BRIEF DESCRIPTION OF THE DRAWINGS

The accompanying drawings referred to in the specification are a part of this disclosure, and provide illustrative embodiments consistent with the disclosure and, together with the detailed description, serve to illustrate some embodiments of the disclosure.

DETAILED DESCRIPTION

Figure 1:
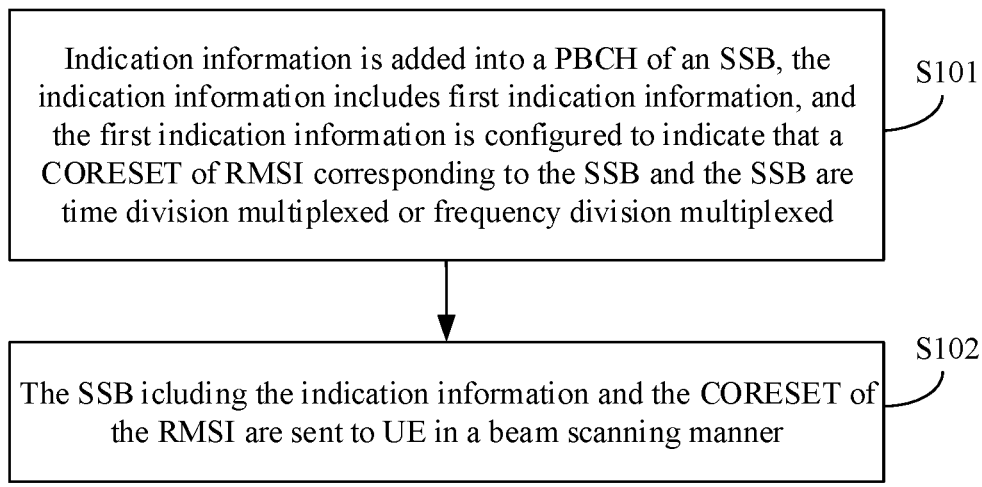
FIG. 1 is a flowchart showing a method for indicating frequency-domain information of a CORESET of RMSI, according to some embodiments of the present disclosure.

Exemplary embodiments (examples of which are illustrated in the accompanying drawings) are elaborated below. The following description refers to the accompanying drawings, in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the subject disclosure. Rather, they are merely examples of the apparatus and method in accordance with certain aspects herein as recited in the accompanying claims.

FIG. 1 is a flowchart showing a method for indicating frequency-domain information of a CORESET of RMSI, according to some embodiments of the present disclosure. The embodiments are described based on a base station side. As illustrated in FIG. 1, the method for indicating the frequency-domain information of the CORESET of the RMSI includes the following blocks.

In S101, indication information is added into a PBCH of an SSB, the indication information includes first indication information, and the first indication information is configured to indicate whether a CORESET of RMSI corresponding to the SSB and the SSB are time division multiplexed or frequency division multiplexed.

The CORESET of the RMSI refers to a time/frequency resource position where a control channel of the RMSI is located, and the CORESET of the RMSI may also be called a CORESET for/of the control channel PUCCH of the RMSI.

Figure 2:
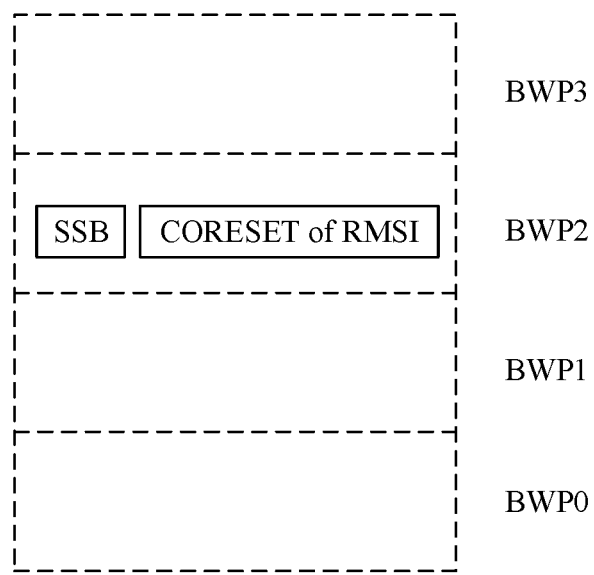
FIG. 2 is a schematic diagram illustrating a frequency-domain relationship in case a CORESET of RMSI corresponding to an SSB and the SSB are time division multiplexed, according to some embodiments of the present disclosure.

In the embodiments, in case the CORESET of the RMSI corresponding to the SSB and the SSB are time division multiplexed, a center frequency of the CORESET of the RMSI corresponding to the SSB and a center frequency of the SSB are the same, as illustrated in FIG. 2.

Figure 3:
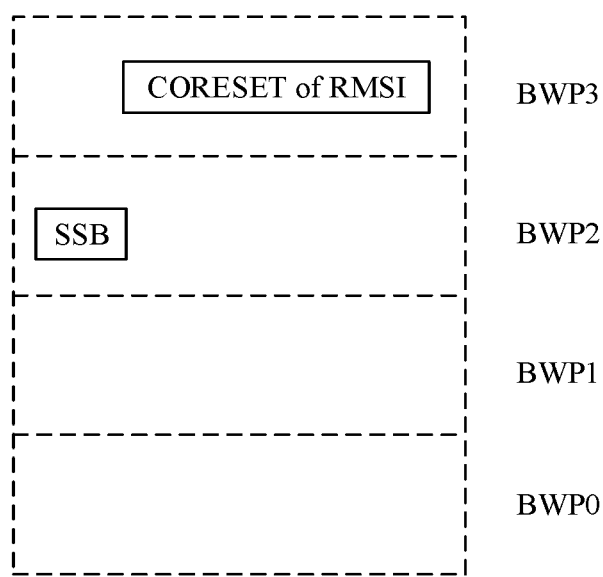
FIG. 3 is a first schematic diagram illustrating a frequency-domain relationship in case a CORESET of RMSI corresponding to an SSB and the SSB are frequency division multiplexed, according to some embodiments of the present disclosure.

In the embodiments, in case the CORESET of the RMSI corresponding to the SSB and the SSB are frequency division multiplexed, the indication information may further include second indication information, and the second indication information is configured to indicate a bandwidth part where the CORESET of the RMSI is located. The bandwidth part where the CORESET of the RMSI is located is different from a bandwidth part where the SSB is located, as illustrated in FIG. 3. The bandwidth part refers to a resource unit with a certain frequency region of a frequency band.

Figure 4:
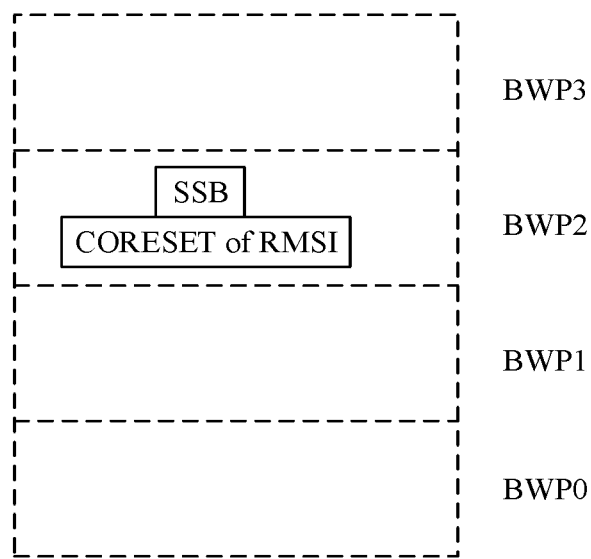
FIG. 4 is a second schematic diagram illustrating a frequency-domain relationship in case a CORESET of RMSI corresponding to an SSB and the SSB are frequency division multiplexed, according to some embodiments of the present disclosure.
Figure 5:
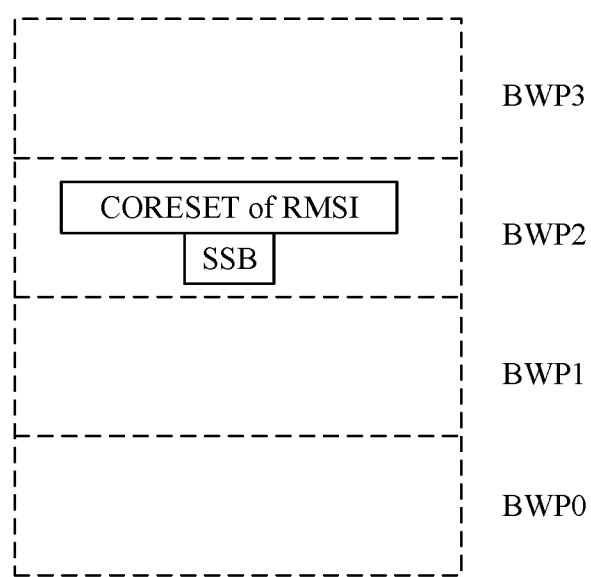
FIG. 5 is a third schematic diagram illustrating a frequency-domain relationship in case a CORESET of RMSI corresponding to an SSB and the SSB are frequency division multiplexed, according to some embodiments of the present disclosure.

In the embodiments, in case the CORESET of the RMSI corresponding to the SSB and the SSB are frequency division multiplexed, the indication information may further include third indication information, and the third indication information may be configured to indicate that the number of REs within a gap in the frequency domain between a low-frequency RE of the SSB and a high-frequency RE of the CORESET of the RMSI is a first set value. The first set value may be any numerical value in a size of a corresponding bandwidth part and is preferably 0. In case the first set value is 0, a positional relationship of the two in the bandwidth part may be illustrated in FIG. 4. In addition, the third indication information may indicate that the number of REs within a gap in the frequency domain between a high-frequency RE of the SSB and a low-frequency RE of the CORESET of the RMSI is a second set value, and the second set value may be any numerical value in the size of the corresponding bandwidth part and is preferably 0. When the second set value is 0, the positional relationship of the two in the bandwidth part may be illustrated in FIG. 5.

According to the embodiments, the indication information and the bandwidth part are combined to represent the frequency-domain information of the CORESET of the RMSI, so that the purpose of reducing a bit overhead is achieved. It can be seen from FIG. 2 to FIG. 5 that the four scenarios may cover all frequency-domain positional relationships of the CORESET of the RMSI and the SSB, namely the frequency-domain positional relationship may be indicated by only two bits, and few bits are used.

In addition, if a frequency-domain position of the CORESET of the RMSI in the bandwidth part is fixed, i.e., in one of the four scenarios illustrated in FIG. 2 to FIG. 5, for SSBs of each beam, contents of the two bits are the same, so that PBCHs may be merged.

In S102, the SSB including the indication information and the CORESET of the RMSI are sent to UE in a beam scanning manner.

A beam width for sending the SSB and a beam width for sending the CORESET of the RMSI may be the same and may also be different.

According to the embodiments, the first indication information is configured to indicate whether the CORESET of the RMSI corresponding to the SSB and the SSB and are time division multiplexed or frequency division multiplexed, and is added into the SSB, and then the first indication information covers all possible frequency-domain positions of the CORESET of the RMSI, such that the frequency-domain information of the CORESET of the RMSI may be indicated with as few bits as possible.

Figure 6:
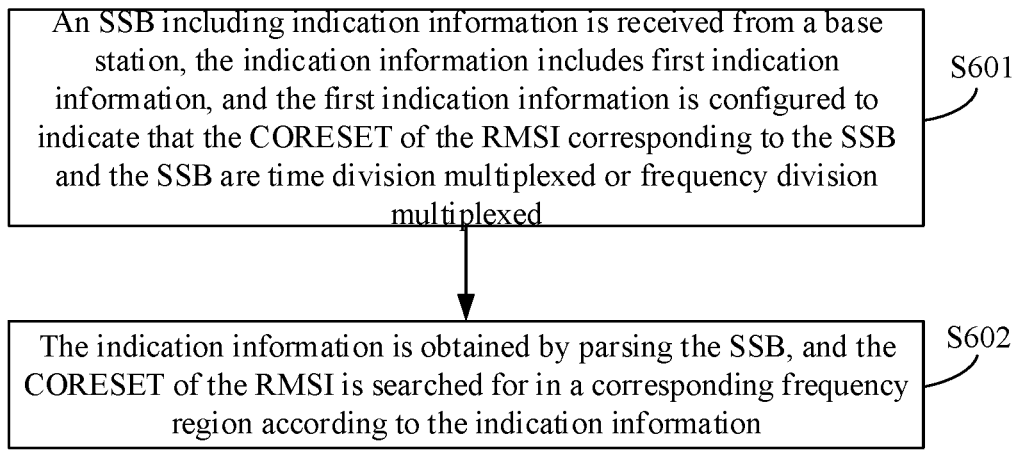
FIG. 6 is a flowchart showing a method for searching for a CORESET of RMSI, according to some embodiments of the present disclosure.

FIG. 6 is a flowchart showing a method for searching for a CORESET of RMSI, according to some embodiments of the present disclosure. The embodiments are described based on a UE side. As illustrated in FIG. 6, the method for searching for the CORESET of the RMSI includes the following blocks.

In S601, an SSB including indication information is received from a base station, the indication information includes first indication information, and the first indication information is configured to indicate that the CORESET of the RMSI corresponding to the SSB and the SSB are time division multiplexed or frequency division multiplexed.

In S602, the indication information is obtained by parsing the SSB, and the CORESET of the RMSI is searched for in a corresponding frequency region according to the indication information.

In the embodiments, when the first indication information indicates that the CORESET of the RMSI corresponding to the SSB and the SSB are time division multiplexed, and UE may search for the CORESET of the RMSI according to a center frequency position where the SSB is located.

In the embodiments, in case the indication information further includes second indication information configured to indicate a bandwidth part where the CORESET of the RMSI is located. In case the bandwidth part where the CORESET of the RMSI is located is different from a bandwidth part where the SSB is located, the UE may search for the CORESET of the RMSI in a bandwidth part except the bandwidth part corresponding to the received SSB.

In the embodiments, when the indication information further includes third indication information, and the third indication information is configured to indicate that the number of REs within a gap in the frequency domain between a low-frequency RE of the SSB and a high-frequency RE of the CORESET of the RMSI is a first set value, the UE may search for the CORESET of the RMSI in a frequency region lower than that corresponding to the received SSB. Frequency region is an abbreviated name of frequency region.

In the embodiments, in case the indication information further includes the third indication information configured to indicate that the number of REs within a gap in the frequency domain between a high-frequency RE of the SSB and a low-frequency RE of the CORESET of the RMSI is a second set value, the UE may search for the CORESET of the RMSI in a frequency region higher than a frequency region corresponding to the received SSB.

According to the embodiments, the CORESET of the RMSI may be searched for in the corresponding frequency region in different manners based on different frequency-domain positional relationships between the SSB and the CORESET of the corresponding RMSI.

According to the embodiments, the SSB including the indication information, which is configured to indicate that the CORESET of the RMSI corresponding to the SSB and the SSB are time division multiplexed or frequency division multiplexed, is received from the base station, searching for the CORESET of the RMSI in the corresponding frequency region is achieved, and few bits are occupied by the frequency-domain information of the CORESET of the RMSI in an implementation process, so that searching efficiency of the CORESET of the RMSI is improved.

Figure 7:
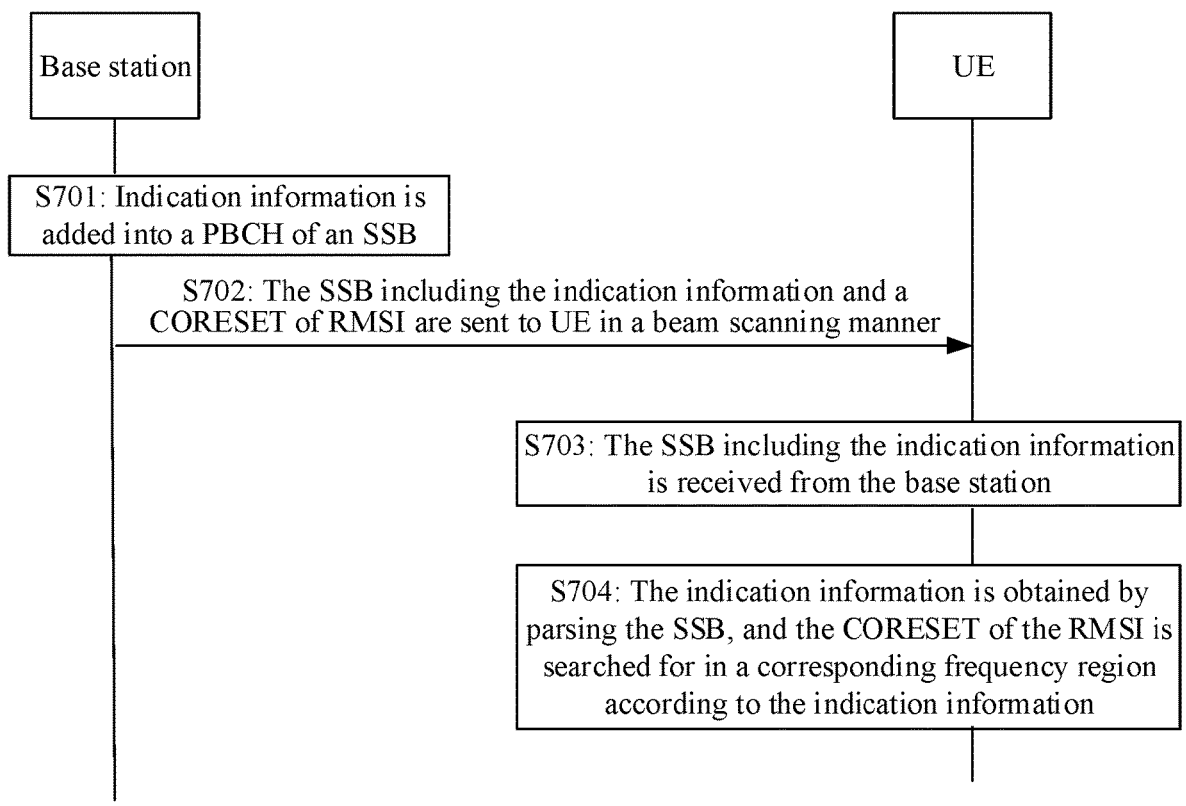
FIG. 7 is a signaling flowchart showing a method for searching for a CORESET of RMSI, according to some embodiments of the present disclosure.

FIG. 7 is a signaling flowchart showing a method for searching for a CORESET of RMSI, according to some embodiments of the present disclosure. The embodiments are described based on the angle of interaction between a base station and UE. As illustrated in FIG. 7, the method includes the following blocks.

In S701, the base station adds indication information into a PBCH of an SSB, the indication information includes first indication information, and the first indication information is configured to indicate whether the CORESET of the RMSI corresponding to the SSB and the SSB are time division multiplexed or frequency division multiplexed.

In S702, the base station sends the SSB including the indication information and the CORESET of the RMSI to the UE in a beam scanning manner.

In S703, the UE receives the SSB including the indication information from the base station.

In S704, the UE parses the SSB to obtain the indication information and searches for the CORESET of the RMSI in a corresponding frequency region according to the indication information.

According to the embodiments, through the interaction between the base station and the UE, frequency-domain information of the CORESET of the RMSI may be indicated with as few bits as possible, and the CORESET of the RMSI may be searched for according to the indication information.

Figure 8:
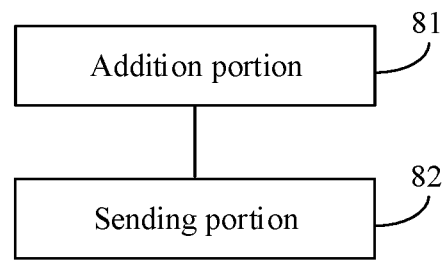
FIG. 8 is a block diagram of a device for indicating frequency-domain information of a CORESET of RMSI, according to some embodiments of the present disclosure.

FIG. 8 is a block diagram of a device for indicating frequency-domain information of a CORESET of RMSI, according to some embodiments of the present disclosure. The device may be in a base station. As illustrated in FIG. 8, the device includes an addition portion 81 and a sending portion 82.

The addition portion 81 is configured to add indication information into a PBCH of an SSB, the indication information including first indication information and the first indication information being configured to indicate that the CORESET of the RMSI corresponding to the SSB and the SSB are time division multiplexed or frequency division multiplexed.

In the embodiments, in case the CORESET of the RMSI corresponding to the SSB and the SSB are time division multiplexed, a center frequency of the CORESET of the RMSI and a center frequency of the SSB are the same, as illustrated in FIG. 2.

In the embodiments, in case the CORESET of the RMSI corresponding to the SSB and the SSB are frequency division multiplexed, the indication information may further include second indication information, and the second indication information is configured to indicate a bandwidth part where the CORESET of the RMSI is located. The bandwidth part where the CORESET of the RMSI is located is different from a bandwidth part where the SSB is located, as illustrated in FIG. 3. The bandwidth part refers to a resource unit with a certain frequency region of a frequency band.

In the embodiments, in case the CORESET of the RMSI corresponding to the SSB and the SSB are frequency division multiplexed, the indication information may further include third indication information, and the third indication information may be configured to indicate that the number of REs within a gap in the frequency domain between a low-frequency RE of the SSB and a high-frequency RE of the CORESET of the RMSI is a first set value. The first set value may be any numerical value in a size of a corresponding bandwidth part and is preferably 0. When the first set value is 0, a positional relationship of the two in the bandwidth part may be illustrated in FIG. 4. In addition, the third indication information may indicate that the number of REs within a gap in the frequency domain between a high-frequency RE of the SSB and a low-frequency RE of the CORESET of the RMSI is a second set value, and the second set value may be any numerical value in the size of the corresponding bandwidth part and is preferably 0. When the second set value is 0, the positional relationship of the two in the bandwidth part may be illustrated in FIG. 5.

According to the embodiments, the indication information and the bandwidth part are combined to represent the frequency-domain information of the CORESET of the RMSI, so that the purpose of reducing a bit overhead is achieved. It can be seen from FIG. 2 to FIG. 5 that the four scenarios may cover all frequency-domain positional relationships of the CORESET of the RMSI and the SSB, namely the frequency-domain positional relationship may be indicated by only two bits, and few bits are used.

In addition, if a frequency-domain position of the CORESET of the RMSI in the bandwidth part is fixed, i.e., in one of the four scenarios illustrated in FIG. 2 to FIG. 5, for SSBs of each beam, contents of the two bits are the same, so that PBCHs may be merged.

The sending portion 82 is configured to send the SSB including the indication information added by the addition portion 81 and the CORESET of the RMSI to UE in a beam scanning manner.

A beam width for sending the SSB and a beam width for sending the CORESET of the RMSI may be the same and may also be different.

According to the embodiments, the first indication information configured to indicate whether the CORESET of the RMSI corresponding to the SSB and the SSB are time division multiplexed or frequency division multiplexed is added into the SSB, and then the first indication information covers all possible frequency-domain positions of the CORESET of the RMSI, so that the frequency-domain information of the CORESET of the RMSI may be indicated with as few bits as possible.

Figure 9:
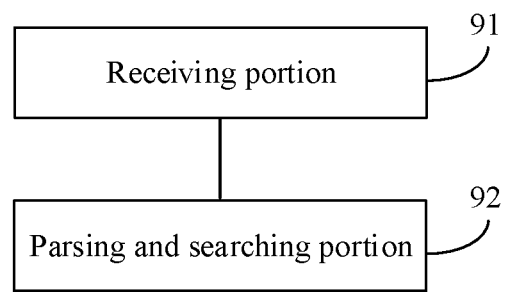
FIG. 9 is a block diagram of a device for searching for a CORESET of RMSI, according to some embodiments of the present disclosure.

FIG. 9 is a block diagram of a device for searching for a CORESET of RMSI, according to some embodiments of the present disclosure. The device may be in UE. As illustrated in FIG. 9, the device includes a receiving portion 91 and a parsing and searching portion 92.

The receiving portion 91 is configured to receive an SSB including indication information from a base station, the indication information including first indication information and the first indication information being configured to indicate that the CORESET of the RMSI corresponding to the SSB and the SSB are time division multiplexed or frequency division multiplexed.

The parsing and searching portion 92 is configured to obtain the indication information by parsing the SSB received by the receiving portion 91, and search for the CORESET of the RMSI in a corresponding frequency region according to the indication information.

According to the embodiments, the SSB including the indication information configured to indicate whether the CORESET of the RMSI corresponding to the SSB and the SSB are time division multiplexed or frequency division multiplexed is received from the base station, searching for the CORESET of the RMSI in the corresponding frequency region is achieved, and few bits are occupied by the frequency-domain information of the CORESET of the RMSI in an implementation process, so that searching efficiency of the CORESET of the RMSI is improved.

FIG. 10 A is a block diagram of another device for searching for a CORESET of RMSI, according to some embodiments of the present disclosure. As illustrated in FIG. 10A, based on the embodiments illustrated in FIG. 9, when the first indication information indicates that the CORESET of the RMSI corresponding to the SSB and the SSB are time division multiplexed, the parsing and searching portion 92 may include a first searching unit 921.

The first searching unit 921 is configured to search for the CORESET of the RMSI according to a center frequency where the SSB is located.

In the embodiments, when the first indication information indicates that the CORESET of the RMSI corresponding to the SSB and the SSB are time division multiplexed, the UE may search for the CORESET of the RMSI according to the center frequency where the SSB is located.

According to the embodiments, when the first indication information indicates that the CORESET of the RMSI corresponding to the SSB and the SSB are time division multiplexed, the CORESET of the RMSI may be searched for according to the center frequency where the SSB is located, and an implementation manner is simple.

Figure 10A:
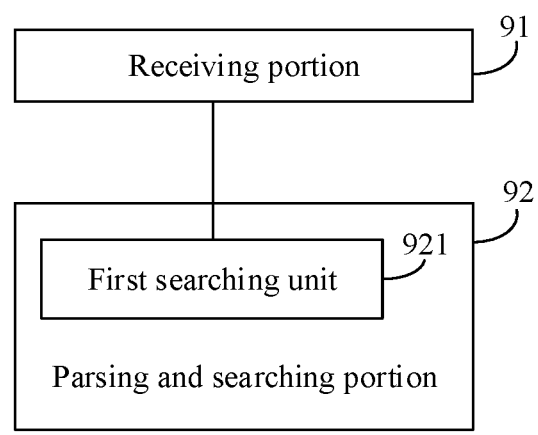
FIG. 10A is a block diagram of another device for searching for a CORESET of RMSI, according to some embodiments of the present disclosure.
Figure 10B:
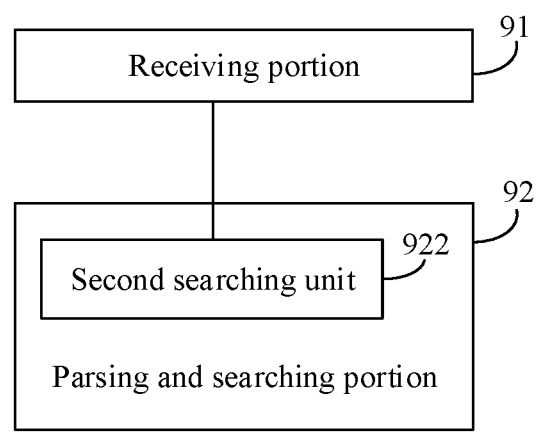
FIG. 10B is a block diagram of another device for searching for a CORESET of RMSI, according to some embodiments of the present disclosure.

FIG. 10B is a block diagram of another device for searching for a CORESET of RMSI, according to some embodiments of the present disclosure. As illustrated in FIG. 10B, based on the embodiments illustrated in FIG. 9, in case the indication information further includes second indication information configured to indicate a bandwidth part where the CORESET of the RMSI is located, and the bandwidth part where the CORESET of the RMSI is located is different from a bandwidth part where the SSB is located, the parsing and searching portion 92 may include a second searching unit 922.

The second searching unit 922 is configured to search for the CORESET of the RMSI in a bandwidth part except the bandwidth part corresponding to the received SSB, the bandwidth part referring to a resource unit with a certain frequency region of a frequency band.

In the embodiments, in case the indication information further includes the second indication information configured to indicate the bandwidth part where the CORESET of the RMSI is located, and the bandwidth part where the CORESET of the RMSI is located is different from the bandwidth part where the SSB is located, the UE may search for the CORESET of the RMSI in a bandwidth part except the bandwidth part corresponding to the received SSB.

According to the embodiments, when the bandwidth part where the CORESET of the RMSI is located is different from the bandwidth part where the SSB is located, the CORESET of the RMSI is searched for in a bandwidth part except the bandwidth part corresponding to the received SSB, and an implementation manner is simple.

Figure 10C:
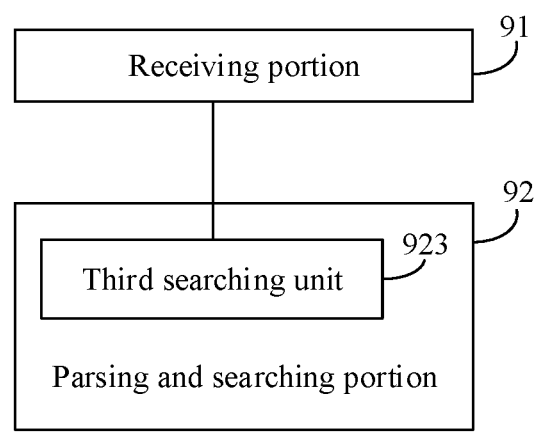
FIG. 10C is a block diagram of another device for searching for a CORESET of RMSI, according to some embodiments of the present disclosure.

FIG. 10C is a block diagram of another device for searching for a CORESET of RMSI, according to some embodiments of the present disclosure. As illustrated in FIG. 10C, based on the embodiments illustrated in FIG. 9, when the indication information further includes third indication information, and the third indication information is configured to indicate that the number of REs within a gap in the frequency domain between a low-frequency RE of the SSB and a high-frequency RE of the CORESET of the RMSI is a first set value, the parsing and searching portion 92 may include a third searching unit 923.

The third searching unit 923 is configured to search for the CORESET of the RMSI in a frequency region lower than that corresponding to the received SSB.

According to the embodiments, when the number of REs within a gap in the frequency domain between the low-frequency RE of the SSB and the high-frequency RE of the CORESET of the RMSI is the first set value, the CORESET of the RMSI is searched for in the frequency region lower than the frequency region corresponding to the received SSB, and an implementation manner is simple.

Figure 10D:
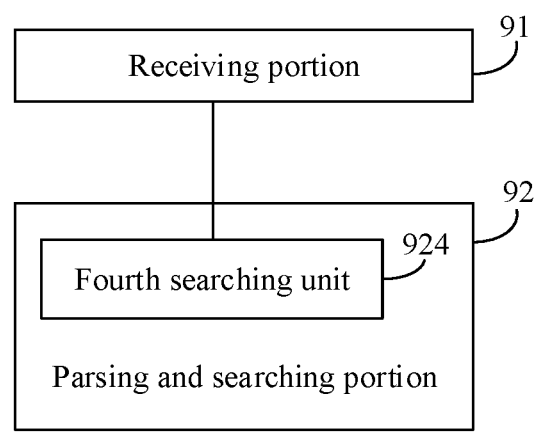
FIG. 10D is a block diagram of another device for searching for a CORESET of RMSI, according to some embodiments of the present disclosure.

FIG. 10D is a block diagram of another device for searching for a CORESET of RMSI, according to some embodiments of the present disclosure. As illustrated in FIG. 10D, based on the embodiments illustrated in FIG. 9, when the indication information further includes the third indication information and the third indication information is configured to indicate that the number of REs within a gap in the frequency domain between a high-frequency RE of the SSB and a low-frequency RE of the CORESET of the RMSI is a second set value, the parsing and searching portion 92 may include a fourth searching unit 924.

The fourth searching unit 924 is configured to search for the CORESET of the RMSI in a frequency region higher than a frequency region corresponding to the received SSB.

According to the embodiments, in case the number of REs within a gap in the frequency domain between a high-frequency RE of the SSB and a low-frequency RE of the CORESET of the RMSI is a second set value, the CORESET of the RMSI is searched for in the frequency region higher than the frequency region corresponding to the received SSB, and an implementation manner is simple.

Figure 11:
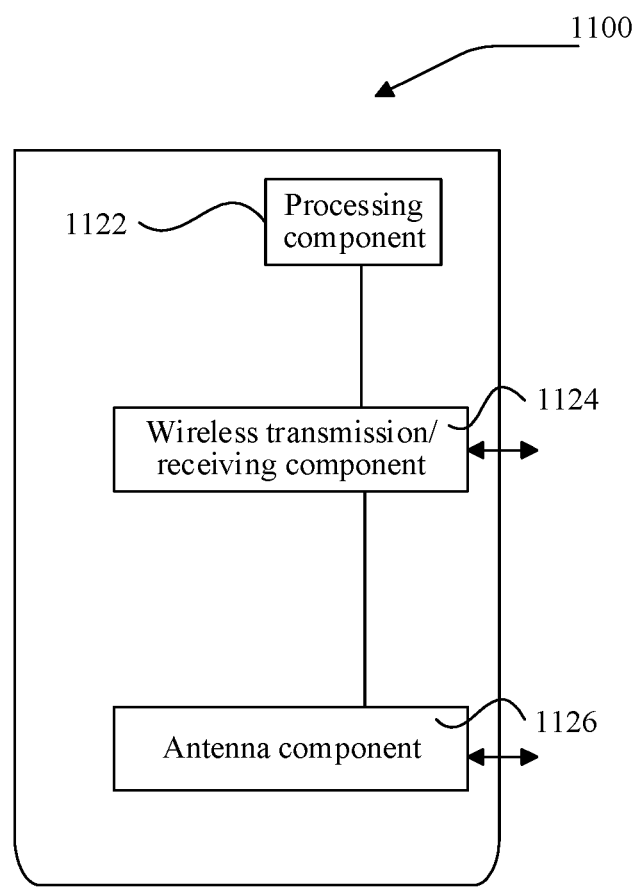
FIG. 11 is a block diagram of a device for indicating frequency-domain information of a CORESET of RMSI, according to some embodiments of the present disclosure.

FIG. 11 is a block diagram of a device for indicating frequency-domain information of a CORESET of RMSI, according to some embodiments of the present disclosure. The device 1100 may be provided as a base station. Referring to FIG. 11, the device 1100 includes a processing component 1122, a wireless transmission/receiving component 1124, an antenna component 1126 and a wireless interface-specific signal processing part, and the processing component 1122 may further include one or more processors.

One processor in the processing component 1122 may be configured to:

add indication information into a PBCH of an SSB, the indication information including first indication information and the first indication information being configured to indicate that a CORESET of RMSI corresponding to the SSB and the SSB are time division multiplexed or frequency division multiplexed; and send the SSB including the indication information and the CORESET of the RMSI to UE in a beam scanning manner.

In some embodiments of the present disclosure, there is also provided a non-transitory computer-readable storage medium including instructions, and the instructions may be executed by the processing component 1122 of the device 1100 to implement the method for indicating the frequency-domain information of the common CORESET of the RMSI. For example, the non-transitory computer-readable storage medium may be a read-only memory (ROM), a compact disc read-only memory (CD-ROM), a magnetic tape, a floppy disc, an optical data storage device and the like.

Figure 12:
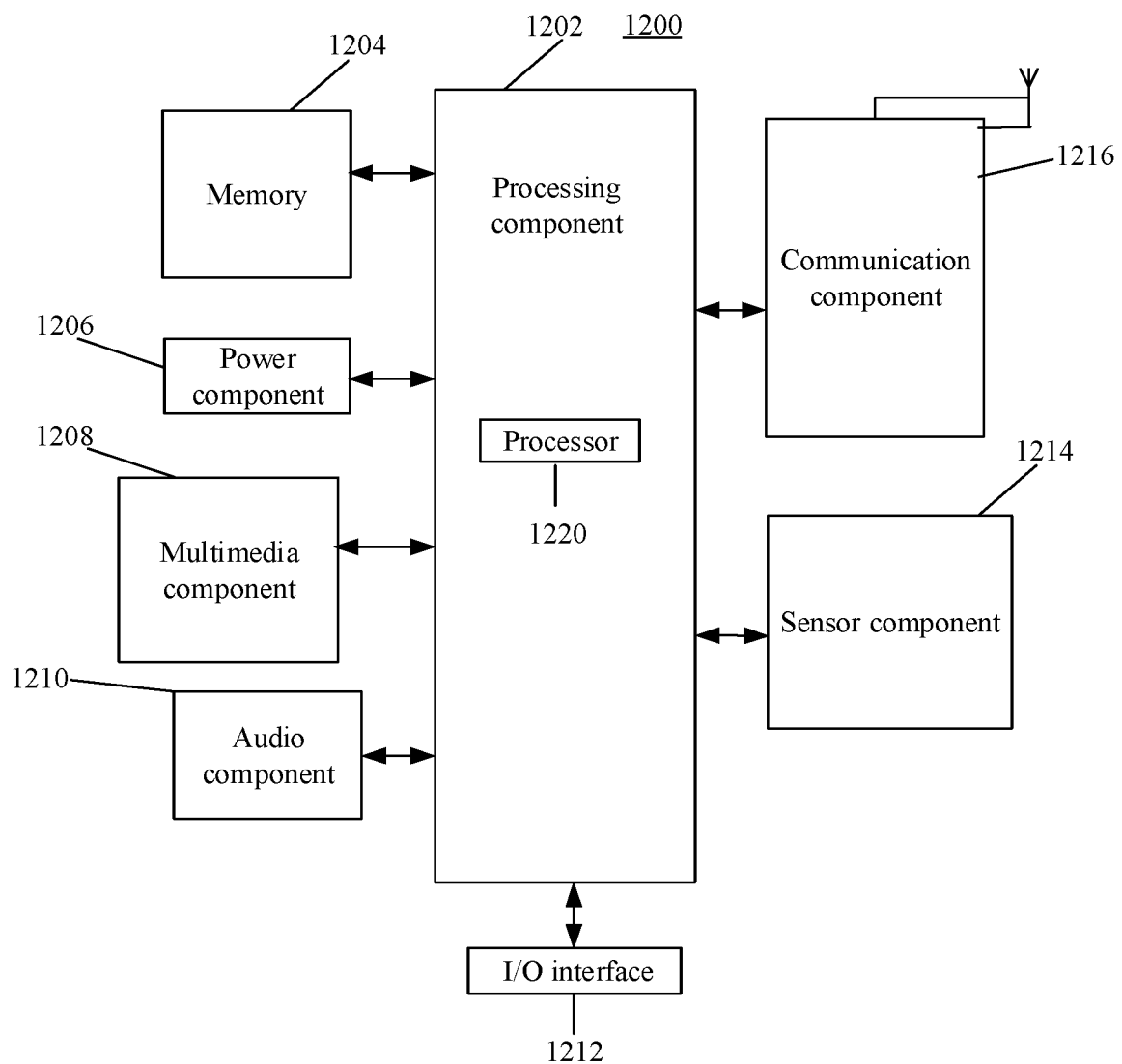
FIG. 12 is a block diagram of a device for searching for a CORESET of RMSI, according to some embodiments of the present disclosure.

FIG. 12 is a block diagram of a device for searching for a CORESET of RMSI, according to some embodiments of the present disclosure. For example, the device 1200 may be UE such as a mobile phone, a computer, a digital broadcast terminal, a messaging device, a gaming console, a tablet, a medical device, exercise equipment, a personal digital assistant, and the like.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 typically controls overall operations of the device 1200, such as the operations associated with display, telephone calls, data communications, camera operations, and recording operations. The processing component 1202 may include one or more processors 1220 to execute instructions to perform all or part of the blocks in the abovementioned method. Moreover, the processing component 1202 may include one or more modules which facilitate interaction between the processing component 1202 and other components. For instance, the processing component 1202 may include a multimedia module to facilitate interaction between the multimedia component 1208 and the processing component 1202.

One processor 1220 in the processing component 1202 may be configured to:

receive an SSB including indication information from a base station, the indication information including first indication information and the first indication information being configured to indicate whether a CORESET of RMSI corresponding to the SSB and the SSB are time division multiplexed or frequency division multiplexed; and obtain the indication information by parsing the SSB, and search for the CORESET of the RMSI in a corresponding frequency region according to the indication information.

The memory 1204 is configured to store various types of data to support the operation of the device 1200. Examples of such data include instructions for any applications or methods operated on the device 1200, contact data, phonebook data, messages, pictures, video, etc. The memory 1204 may be implemented by any type of volatile or non-volatile memory devices, or a combination thereof, such as an electrically erasable programmable read-only memory (EEPROM), an erasable programmable read-only memory (EPROM), a programmable read-only memory (PROM), an ROM, a magnetic memory, a flash memory, and a magnetic or optical disk.

The power component 1206 provides power to various components of the device 1200. The power component 1206 may include a power management system, one or more power supplies, and other components associated with generation, management and distribution of power for the device 1200.

The multimedia component 1208 includes a screen providing an output interface between the device 1200 and a user. In some embodiments, the screen may include a liquid crystal display (LCD) and a touch panel (TP). In some embodiments, organic light-emitting diode (OLED) or other types of displays can be employed. If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also detect a period of time and a pressure associated with the touch or swipe action. In some embodiments, the multimedia component 1208 includes a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a microphone (MIC), and the MIC is configured to receive an external audio signal when the device 1200 is in an operation mode, such as a call mode, a recording mode and a voice recognition mode. The received audio signal may further be stored in the memory 1204 or sent through the communication component 1216. In some embodiments, the audio component 1210 further includes a speaker configured to output the audio signal.

The I/O interface 1212 provides an interface between the processing component 1202 and peripheral interface modules, such as a keyboard, a click wheel, buttons and the like. The buttons may include, but are not limited to: a home button, a volume button, a starting button and a locking button.

The sensor component 1214 includes one or more sensors configured to provide status assessments of various aspects of the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a complementary metal oxide semiconductor (CMOS) or charge coupled device (CCD) image sensor, configured for use in an imaging application. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and other devices. The device 1200 may access a communication-standard-based wireless network, such as a wireless fidelity (Wi-Fi) network, a 2nd-generation (2G), 3rd-generation (3G), 4th-Generation (4G), or 5th-Generation (5G) network or a combination thereof. In some embodiments of the present disclosure, the communication component 1216 receives a broadcast signal or broadcast associated information from an external broadcast management system through a broadcast channel. In some embodiments of the present disclosure, the communication component 1216 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In some embodiments of the present disclosure, the device 1200 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, micro-processors or other electronic components, and is configured to execute the method for searching for the CORESET of the RMSI.

In some embodiments of the present disclosure, there is also provided a non-transitory computer-readable storage medium including instructions, such as included in the memory 1204, executable by the processor 1220 of the device 1200 for performing the abovementioned methods. For example, the non-transitory computer-readable storage medium may be a ROM, a RAM, a CD-ROM, a magnetic tape, a floppy disc, an optical data storage device, and the like.

The device embodiments substantially correspond to the method embodiments, and thus related parts refer to part of descriptions of the method embodiments. The device embodiment described above is only schematic, units described as separate parts therein may or may not be physically separated, and parts displayed as units may or may not be physical units, and namely may be located in the same place or may also be distributed to multiple network units. Part or all of the modules therein may be selected according to a practical requirement to achieve the purpose of the solutions of the embodiments. Those of ordinary skill in the art may understand and implement without creative work.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for indicating relative position information of a common control resource set (CORESET) of remaining minimum system information (RMSI), for applying to a base station, the method comprising:
   determining indication information included in a physical broadcast channel (PBCH) of a synchronization signal block (SSB), the indication information comprising first indication information and the first indication information being configured to indicate whether the SSB and the CORESET of RMSI corresponding to the SSB are time division multiplexed or frequency division multiplexed; the indication information being further configured to indicate whether a bandwidth part where the CORESET of the RMSI corresponding to the SSB is located is different from a bandwidth part where the SSB is located, the bandwidth part referring to a resource unit with a certain frequency region of a frequency band; and
   sending the SSB including the indication information and the CORESET of the RMSI to user equipment (UE).

2. The method of claim 1, wherein the first indication information is configured to indicate all frequency-domain positional relationships between the SSB and the CORESET of the RMSI corresponding to the SSB.

3. The method of claim 1, wherein, in response to the first indication information indicating that the SSB and the CORESET of the RMSI corresponding to the SSB are frequency division multiplexed, the indication information further comprises second indication information, and the second indication information is configured to indicate the bandwidth part where the CORESET of the RMSI is located is different from the bandwidth part where the SSB is located.

4. The method of claim 1, wherein, in response to the first indication information indicating that the SSB and the CORESET of the RMSI corresponding to the SSB are frequency division multiplexed, the indication information further comprises third indication information, and the third indication information is configured to indicate the bandwidth part where the CORESET of the RMSI is located is same as the bandwidth part where the SSB is located, and indicate an offset between the SSB and the CORESET of the RMSI corresponding to the SSB.

5. The method of claim 4, wherein the offset between the SSB and the CORESET of the RMSI corresponding to the SSB is a number of resource elements (REs) within a gap in the frequency domain between a low-frequency RE of the SSB and a high-frequency RE of the CORESET of the RMSI.

6. The method of claim 4, wherein the offset between the SSB and the CORESET of the RMSI corresponding to the SSB is a number of REs within a gap in the frequency domain between a high-frequency RE of the SSB and a low-frequency RE of the CORESET of the RMSI.

7. The method of claim 1, wherein the first indication information is configured to indicate that the SSB and the CORESET of the RMSI corresponding to the SSB are time division multiplexed; wherein the indication information further comprises fourth indication information, and the fourth indication information is configured to indicate the bandwidth part where the CORESET of the RMSI is located is same as the bandwidth part where the SSB is located, and indicate a center frequency of the CORESET of the RMSI and a center frequency of the SSB are same.

8. A communication system implementing the method of claim 1, comprising the base station configured to add, in the SSB, the first indication information.

9. The communication system of claim 8, wherein the first indication information covers all possible frequency-domain positions of the CORESET of the RMSI, such that the frequency-domain information of the CORESET of the RMSI is indicated with minimized bits.

10. The communication system of claim 9, further comprising the UE configured to:
   receive, from the base station, the SSB including the indication information; and
   search for the CORESET of the RMSI in the corresponding frequency region with the minimized bits occupied by the frequency-domain information of the CORESET of the RMSI, to thereby improve searching efficiency of the CORESET of the RMSI.

11. A method for obtaining a common control resource set (CORESET) of remaining minimum system information (RMSI), for applying to user equipment (UE), the method comprising:
receiving a synchronization signal block (SSB) including indication information from a base station, the indication information comprising first indication information and the first indication information being configured to indicate whether the SSB and the CORESET of RMSI corresponding to the SSB are time division multiplexed or frequency division multiplexed; the indication information being further configured to indicate whether a bandwidth part where the CORESET of the RMSI corresponding to the SSB is located is different from a bandwidth part where the SSB is located, the bandwidth part referring to a resource unit with a certain frequency region of a frequency band; and
obtaining the indication information from the SSB.

12. The method of claim 11, wherein the first indication information is configured to indicate all frequency-domain positional relationships between the SSB and the CORESET of the RMSI corresponding to the SSB.

13. The method of claim 11, wherein, in response to the first indication information indicating that the SSB and the CORESET of the RMSI corresponding to the SSB are frequency division multiplexed, the indication information further comprises second indication information, and the second indication information is configured to indicate the bandwidth part where the CORESET of the RMSI is located is different from the bandwidth part where the SSB is located.

14. The method of claim 11, wherein, in response to the first indication information indicating that the SSB and the CORESET of the RMSI corresponding to the SSB are frequency division multiplexed, the indication information further comprises third indication information, and the third indication information is configured to indicate the bandwidth part where the CORESET of the RMSI is located is same as the bandwidth part where the SSB is located, and indicate an offset between the SSB and the CORESET of the RMSI corresponding to the SSB.

15. The method of claim 14, wherein the offset between the SSB and the CORESET of the RMSI corresponding to the SSB is a number of resource elements (REs) within a gap in the frequency domain between a low-frequency RE of the SSB and a high-frequency RE of the CORESET of the RMSI.

16. The method of claim 14, wherein the offset between the SSB and the CORESET of the RMSI corresponding to the SSB is a number of REs within a gap in the frequency domain between a high-frequency RE of the SSB and a low-frequency RE of the CORESET of the RMSI.

17. The method of claim 11, wherein the first indication information is configured to indicate that the SSB and the CORESET of the RMSI corresponding to the SSB are time division multiplexed; wherein the indication information further comprises fourth indication information, and the fourth indication information is configured to indicate the bandwidth part where the CORESET of the RMSI is located is same as the bandwidth part where the SSB is located, and indicate a center frequency of the CORESET of the RMSI and a center frequency of the SSB are same.

18. User equipment (UE), comprising:
a processor; and
a memory device configured to store instructions executable for the processor,
wherein the processor is configured to:
receive a synchronization signal block (SSB) including indication information from a base station, the indication information comprising first indication information and the first indication information being configured to indicate whether the SSB and a common control resource set (CORESET of remaining minimum system information (RMSI corresponding to the SSB are time division multiplexed or frequency division multiplexed; the indication information being further configured to indicate whether a bandwidth part where the CORESET of the RMSI corresponding to the SSB is located is different from a bandwidth part where the SSB is located, the bandwidth part referring to a resource unit with a certain frequency region of a frequency band; and
obtain the indication information from the SSB.

* * * * *